United States Patent [19]

Sakai et al.

[11] Patent Number: 5,038,608
[45] Date of Patent: Aug. 13, 1991

[54] METHOD FOR MEASURING THE FLOW RATE OF EXHAUST GAS

[75] Inventors: Hiroyuki Sakai; Eiichi Shirakawa; Kimiharu Matsumura, all of Kumamoto, Japan

[73] Assignees: Tokyo Electron Limited, Tokyo; Tel Kyushu Limited, Kumamoto; Kabushiki Kaisha Toshiba, Kawasaki, all of Japan

[21] Appl. No.: 468,361

[22] Filed: Jan. 22, 1990

[30] Foreign Application Priority Data

Feb. 10, 1989 [JP] Japan .................................. 1-31925

[51] Int. Cl.⁵ .............................................. G01F 5/00
[52] U.S. Cl. .............................................. 73/202; 73/3
[58] Field of Search ................ 73/202, 202.5, 204.21, 73/861, 861.62, 861.65, 3

[56] References Cited

U.S. PATENT DOCUMENTS

| | | | |
|---|---|---|---|
| 2,342,290 | 2/1944 | Miller | 73/202 |
| 2,729,976 | 1/1956 | Laub | 73/204.16 |
| 3,735,752 | 5/1973 | Rodder | 73/204.21 X |
| 4,231,253 | 11/1980 | Ohnhaus et al. | 73/861.62 |
| 4,366,704 | 1/1983 | Sato et al. | 73/202 X |
| 4,487,062 | 12/1984 | Olin et al. | 73/202.5 |
| 4,570,493 | 2/1986 | Leemhuis | 73/861.65 X |
| 4,879,898 | 11/1989 | Bamer | 73/202.5 |

Primary Examiner—Herbert Goldstein
Attorney, Agent, or Firm—Oblon, Spivak, McClelland, Maier & Neustadt

[57] ABSTRACT

In a method of measuring the flow rate of an exhaust gas, an external atmosphere is caused to flow into a pipe which branches off from the main pipe to open at the other end onto the external atmosphere. The flow rate of the atmosphere in the branched-pipe is measured, and the flow rate of the exhaust gas in the main pipe corresponding to the measured value is determined based on a calibration curve.

3 Claims, 2 Drawing Sheets

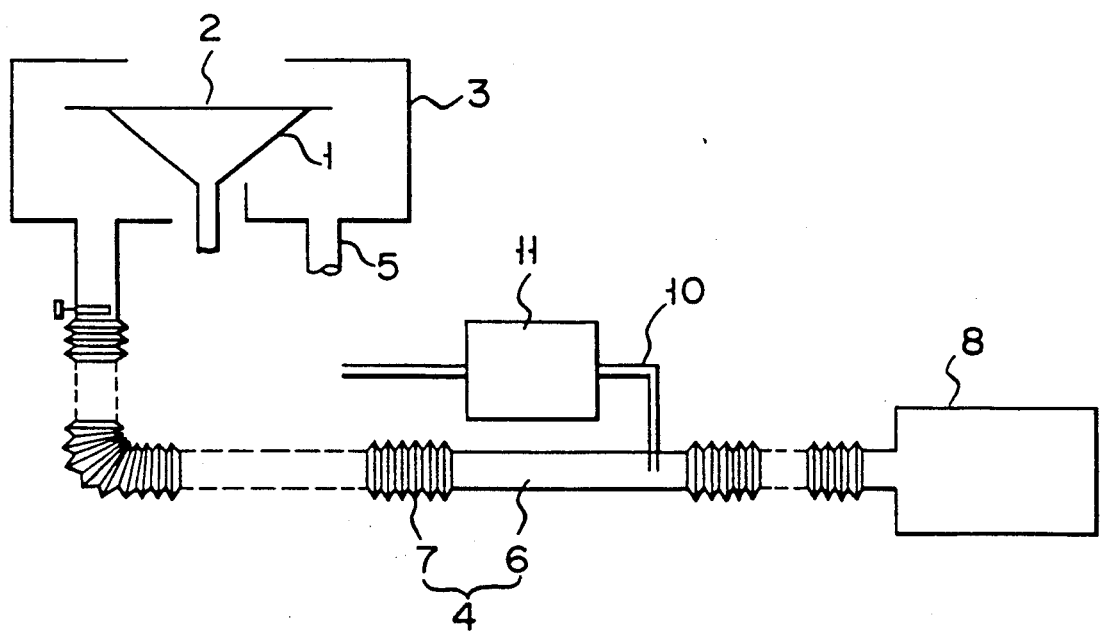
F I G. 1

METHOD FOR MEASURING THE FLOW RATE OF EXHAUST GAS

BACKGROUND OF THE INVENTION

1. Field of the Invention

The present invention relates to a method for measuring the flow rate of an exhaust gas.

2. Description of the Related Art

In a conventional method for measuring the flow rate of fluid passing through a pipe, the flow rate is determined by the difference between the pressure in the pipe and the external pressure. This method is applied in, for example, a spin coating apparatus used in manufacturing a semiconductor device, to measure the rate at which exhaust gas flows through a pipe. More specifically, a semiconductor wafer is placed on a supporting stage provided in a coater cup. While the stage is being rotated at a high speed, photoresist is dripped onto the wafer, spread thinly by centrifugal force, and coated thereon. In this process, the surplus photoresist diffuses into the surrounding gas like mist. For this reason, to discharge the gas containing the surplus photoresist, a gas-discharging mechanism is used. The gas-discharging mechanism has a pressure sensor such as a pitot tube to measure the flow rate of the gas discharged through the exhaust pipe. A differential manometer is connected to the pitot tube, and measures the difference between the atmospheric pressure and the pressure of the exhaust gas in the pipe, from which the flow velocity of the exhaust gas is determined. The flow rate is obtained based on this velocity.

According to the above-described conventional method, impurities in the exhaust gas, such as the mist-like photoresist, adhere to and clog the inlet of the pitot tube. As a result, the flow rate cannot be measured accurately.

SUMMARY OF THE INVENTION

An object of the present invention is to provide a method for measuring the flow rate of an exhaust gas, in which the measuring system is prevented from being clogged by impurities in the fluid to be measured, and the flow rate can be measured accurately over a long period of time.

The method of the present invention comprises the steps of:

causing an atmosphere to flow into a sub-pipe which branches off from a main pipe;

measuring the flow rate of the atmosphere flowing through the sub-pipe; and determining the flow rate of an exhaust gas flowing through the main tube in accordance with the flow rate of the atmosphere flowing through the sub-pipe based on a calibration curve representing the relationship between the flow rate of the exhaust gas flowing through the main pipe and that of the atmosphere flowing through the sub-pipe.

BRIEF DESCRIPTION OF THE DRAWINGS

FIG. 1 shows the structure of a spin coating apparatus to which an embodiment of the present invention is applied;

DETAILED DESCRIPTION OF THE PREFERRED EMBODIMENTS

Figure 2:
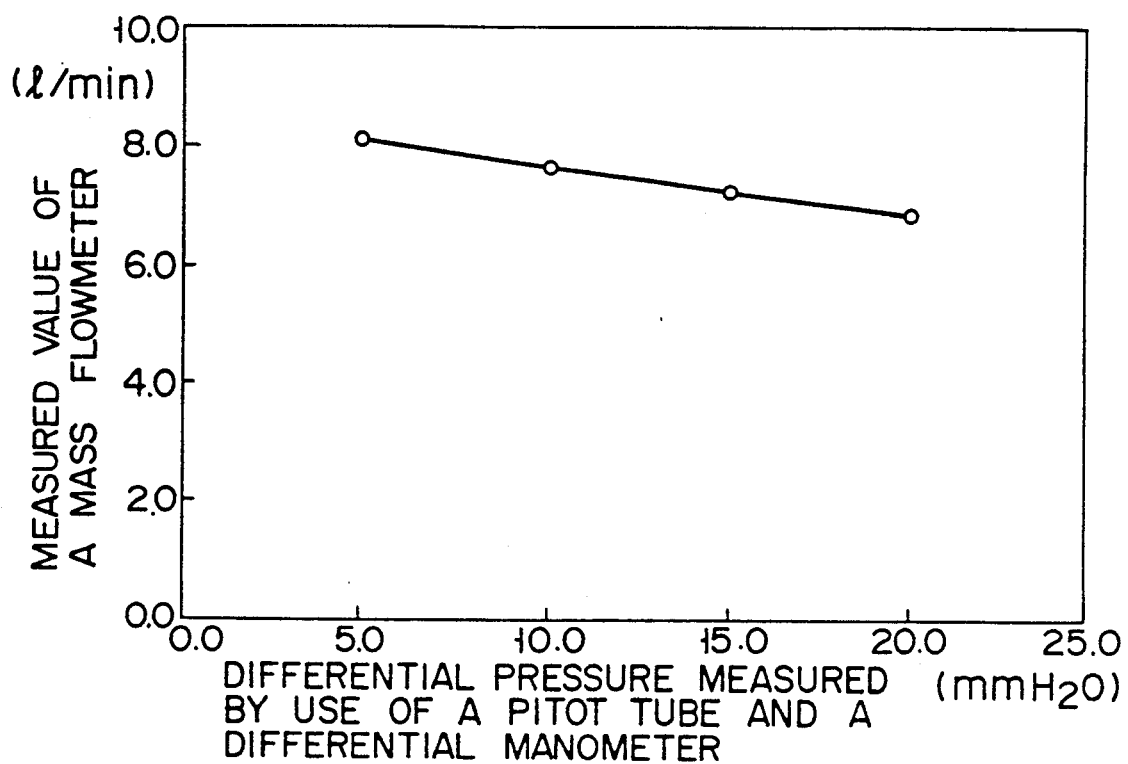
FIG. 2 is a diagram showing the relationship between the measured value obtained by the method of the present invention and the measured value obtained by the conventional method.

An embodiment of the present invention will be described below with respect to a method for measuring the flow rate of an exhaust gas flowing through an exhaust tube in a spin coating apparatus.

In FIG. 1, reference numeral 1 denotes a supporting stage. Semiconductor wafer 2 is placed on the supporting stage and is rotated at high speed by a driving mechanism (not shown). Coater cup 3 is provided so as to cover supporting stage 1 and semiconductor wafer 2. Exhaust pipe 4, for letting gas out of coater cup 3, and discharging pipe 5, for discharging surplus photoresist diffused in coater cup 3, are connected to the bottom of coater cup 3.

Exhaust pipe 4 is, for example, made up of a plurality of pipe bodies and ducts 7, and is, in total, 7 m long. Pipe body 6 is, for example, made of vinyl chloride resin, and has a diameter of 50 mm. Duct 7 connects the pipe bodies to each other and has a 60 mm diameter. One end of exhaust pipe 4 is connected to an exhauster 8.

One end of sub-pipe 10 is inserted in the middle portion of exhaust pipe 4. Sub-pipe 10 is made of Teflon tube having an outside diameter of 8 mm and an inside diameter of 6 mm, for example. The entire length of sub-pipe 10 is, for example, 1 m. A flow-rate measuring apparatus, for example mass flowmeter 11, is intermediated in the middle portion of sub-pipe 10. The other end of sub-pipe 10 is open to the atmosphere. Sub-pipe 10 causes the atmosphere to flow into exhaust pipe 4 from the open end, via mass flowmeter 11.

Sub-pipe 10 may be made of, for example, metal. The outside and inside diameters and the entire length of sub-pipe 10 should be selected in accordance with the efficiency of exhauster 8, the diameter of exhaust pipe 4, the efficiency of mass flowmeter 11, etc., within certain ranges, so that the amount of the atmosphere flowing through sub-pipe 10 is not too much or too little.

The spin coating apparatus thus arranged operates as follows. First, the gas in coater cup 3 is extracted by exhauster 8. In this state, supporting stage 1 is rotated at a high speed, thereby rotating semiconductor wafer 2. Then, a predetermined amount of photoresist is dripped onto the approximate center of the surface of semiconductor wafer 2. As a result, the photoresist is spread by centrifugal force and coated uniformly on the surface of wafer 2.

In accordance with the exhaust operation by exhauster 8, the external atmosphere flows into exhaust pipe 4 from the open end of sub-pipe 10 via mass flowmeter 11. The flow rate of the atmosphere is measured by mass flowmeter 11. From the measured value of mass flowmeter 11, the flow rate of exhaust gas discharged from coater cup 3 through exhaust pipe 4 is determined.

Experiments were performed to research the relationship between the measured value obtained by mass flowmeter 11 and the measured value obtained by a pitot tube and a differential manometer according to the conventional method, and the results are shown in FIG. 2.

Also, experiments in which an air speedometer is provided in exhaust pipe 4 were performed to research the relationship between the measured value obtained by mass flowmeter 11 and the flow rate measured by the air speedometer. The results are shown in FIG. 3.

Figure 3:
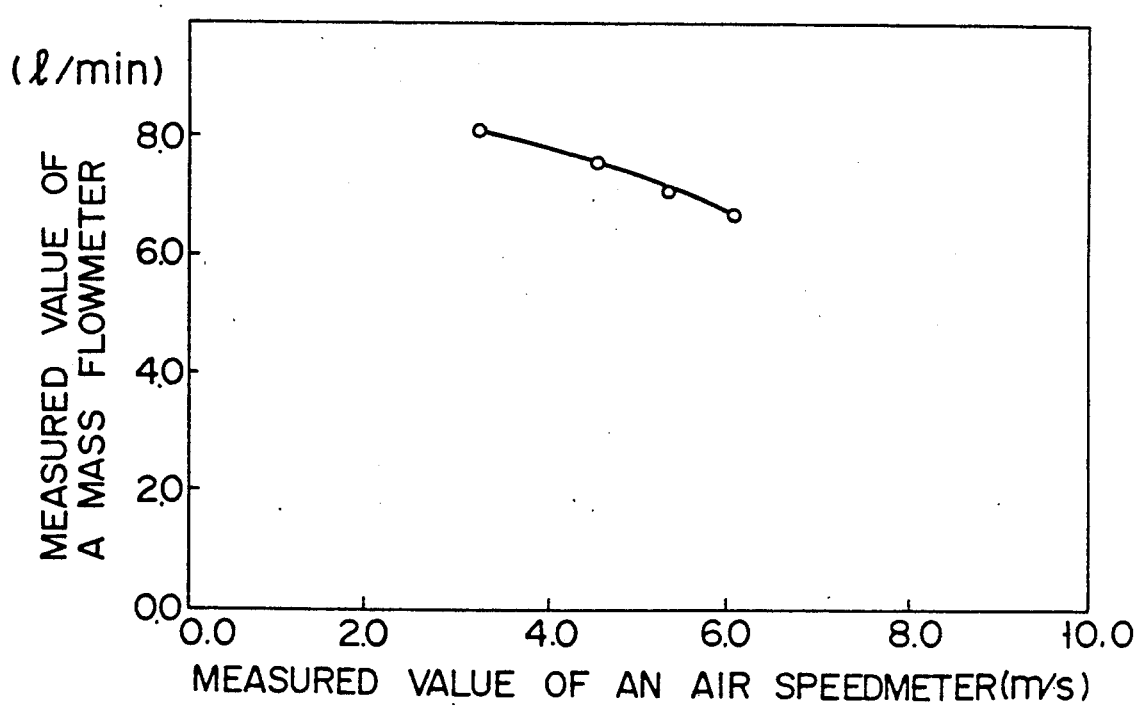
FIG. 3 is a diagram showing the relationship between the measured value obtained by the method of the present invention and the measured value obtained by means of an air speedometer.

As is obvious from FIGS. 2 and 3, the flow rate (flow velocity) of exhaust gas in exhaust pipe 4 has a certain functional relation with the flow rate of the atmosphere flowing from the open end of sub-pipe 10 into exhaust pipe 4 via mass flowmeter 11. Therefore, the flow rate of exhaust gas in pipe 4 can be determined from a measured value of mass flowmeter 11 using a calibration curve as shown in FIGS. 2 and 3, obtained by observation.

During the above-described measuring operation, the external atmosphere flows into sub-pipe 10 and mass flowmeter 11, and the exhaust gas flowing through exhaust pipe 4 does not. For this reason, impurities in the exhaust gas, such as photoresist, do not adhere to the inside of mass flowmeter 11 and sub-pipe 10. Therefore, according to the present invention, the flow rate of the exhaust gas can be measured accurately over a long period of time.

Although a mass flowmeter is used to measure the flow rate in the above embodiment, any other flow measuring apparatuses can be substituted.

What is claimed is:

1. A method for measuring the flow rate of an exhaust gas comprising the steps of:
   causing an atmosphere to flow into a sub-pipe branched from a main pipe, said sub-pipe having an inside diameter one-fifth or smaller than that of the inside diameter of the main pipe;
   measuring the flow rate of the atmosphere flowing through the sub-pipe with a mass flowmeter; and
   determining the flow rate of an exhaust gas flowing through the main pipe in accordance with the flow rate of the atmosphere flowing through the sub-pipe based on a calibration curve representing the relationship between the flow rate of the exhaust gas flowing through the main pipe and that of the atmosphere flowing through the sub-pipe;
   wherein the calibration curve is obtained from the measured values of the flow rate of exhaust gas measured by a pitot tube and a differential manometer connected thereto, both of which are provided in the main pipe, and the measured values of the flow rate of the atmosphere measured in the sub-pipe.

2. The method for measuring the flow rate of an exhaust gas according to claim 1, wherein the exhaust-gas inlet of the main pipe is connected to a spin coating apparatus, and the exhaust-gas outlet thereof is connected to an exhauster.

3. The method according to claim 1, wherein the step of causing an atmosphere to flow into a sub-pipe includes the step of:
   causing an atmosphere gas, which is cleaner than the exhaust gas flowing in the main pipe, to flow in the sub-pipe.

* * * * *